No. 659,861.  
W. H. SCHOFIELD.  
VEHICLE WHEEL.  
(Application filed Mar. 6, 1900.)  
Patented Oct. 16, 1900.
(No Model.)
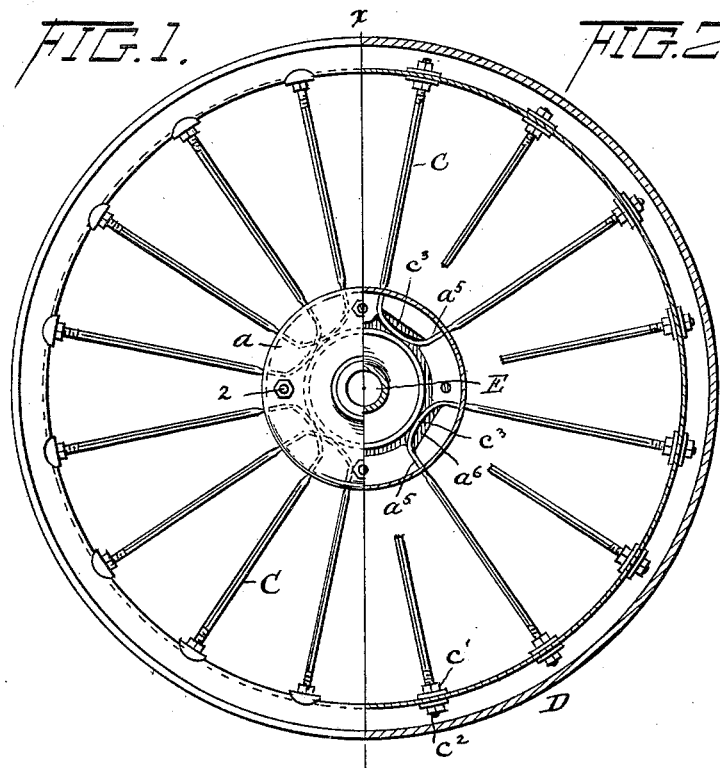
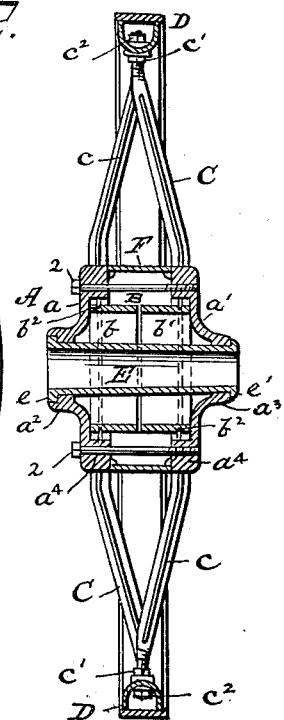
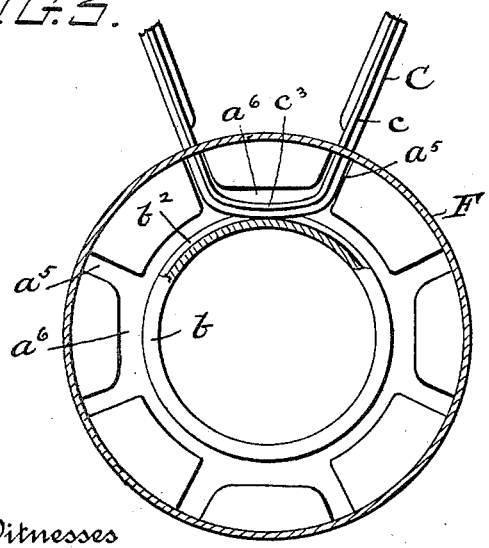
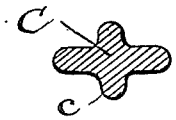
Witnesses  
Sam'l R. Turner  
M. M. Phelps
Inventor  
William Henry Schofield.  
By _____ Benjamin  
Attorney

UNITED STATES PATENT OFFICE.

WILLIAM HENRY SCHOFIELD, OF CHICAGO, ILLINOIS.

VEHICLE-WHEEL.

SPECIFICATION forming part of Letters Patent No. 659,861, dated October 16, 1900.

Application filed March 6, 1900. Serial No. 7,518. (No model.)

*To all whom it may concern:*

Be it known that I, WILLIAM HENRY SCHOFIELD, a citizen of the United States, residing at Chicago, in the county of Cook and State of Illinois, have invented certain new and useful Improvements in Vehicle-Wheels, of which the following is a specification.

My invention relates to the construction of wheels made entirely of metal; and the object of my invention is to produce a wheel of this type which will combine in the highest degree qualities of strength, lightness, resiliency, durability, and economy of construction with beauty of finish and appearance. In carrying out this object I have invented a wheel having resilient felly, spokes, and hub; in which the spokes are of a form combining maximum strength with minimum weight; in which the tension of the spokes may be independently regulated at the felly and uniformly regulated at the hub; in which the spokes are protected from the full impact of end thrusts as well as from side or lateral strain by their hub connections; in which the "hang" of the wheel may be accurately effected; in which by the correlation of the spokes and the hub the load carried by or applied to one set of spokes is distributed to all the other spokes in the wheel, thus equalizing the strain; in which the end thrust on any one spoke is transmitted in part to the spoke on the opposite side of the hub and is received in part by the angularly-arranged lateral bearings provided for the spokes in the hub; in which there is a hollow hub made up of two separate but coöperating elements, one arranged within the other and each bearing a portion of the load; in which a longer bearing is provided in the hub for the spokes than in the ordinary wheel, thus giving increased strength; in which the spokes intersect at the hub; in which U-shaped spokes are provided and arranged, so that they have their rounded portion bearing on the periphery of the inner hub element; in which the spokes are formed with a longitudinal rib which is adapted to fit in a peripheral groove in the inner hub element, whereby lateral displacement of the spoke is prevented; in which a tubular axle box or bearing is fixed in the hub, and in which a collar surrounds the hub between the spokes, thus excluding all dirt and at the same time giving a neat finish to the wheel.

In the accompanying drawings, which form a part of this application, Figure 1 is a view of my improved wheel, partly in elevation and partly in section. Fig. 2 is a vertical section on the line $x\,x$ of Fig. 1. Fig. 3 is a detail, on enlarged scale, showing the relative arrangement of the hub and spoke. Fig. 4 is a detail showing a cross-section of the spoke.

In the drawings the hub of my wheel is shown as composed of two elements A and B, the former representing the outer portion and the latter the inner part of the hub.

C indicates the spokes, which are of the U shape shown, and D the fellies, which are also in U shape and have secured thereto in any suitable manner the tire $d$.

The part A, which hereinafter will be designated as the "hub" of my wheel, is made up of two circular plates $a\,a'$, each having formed therethrough suitable bolt-holes to receive the bolts 2, by which the plates are connected and adjusted to each other, and with central openings to receive the tubular axle-box E. An annular inwardly-extending flange or shoulder $a^4$ is formed on the periphery of the plates $a\,a'$, through which radial grooves or channels $a^5$ are formed and connected by groove $a^6$, said grooves being adapted to receive the spokes and to have their walls bear against said spokes.

The spokes C are preferably formed in the shape shown in cross-section in Fig. 4, with a projecting rib $c$, which may extend throughout the length of the spoke, except where the latter is rounded and threaded to receive the securing and adjusting nuts $c'$ and $c^2$, or it may be dispensed with on the portion of the spoke that rests in the channels $a^5$. The spokes C are bent at their center to form a rounded portion $c^3$, which rests in the channel or groove $a^6$ and contacts with the periphery of the rings forming the inner hub B, the rib $c$ entering an annular groove or depression formed in the face of said rings. It will be noted that the walls of the groove $a^6$ are straight, while the spokes are bent on a curve, thus permitting a certain amount of play to the latter when a load is applied thereto by the pressure of the collar against the spoke, it being understood that said portion of the spoke is held between said collar and the shoulder of the groove $a^6$ and normally in constant contact with the former. The outer ends of the spokes are rounded and threaded, pass through suitable openings in the felly, and are provided with nuts $c'$ $c^2$, the former arranged on the outside of the felly and the latter on the inner side, said nuts providing for the adjustment of the tension of the spokes in a manner well understood, and suitable washers being interposed between the nuts $c'$ and the felly. It will be seen that by loosening the nuts $c'$ and tightening the nuts $c^2$ the spokes will be drawn away from the collars $b$ $b'$ and against the shoulders of the grooves $a^6$, thus reducing the deflection of the spokes at said point, while the contrary effect is obtained by reversing the operation of the nuts. As the spokes are arranged alternately on opposite sides of the hub the adjustment of the nuts as above described enables the user or builder to perfectly true the wheel, thus effecting a correct hang thereto under all conditions.

The felly D is preferably rolled from sheet metal in a single piece bent in the U shape shown, though it may be made in sections secured together in any suitable manner. The material as well as the shape provide a felly having resiliency, which is especially desirable, as it is at the periphery of the wheel, the point of initial impact.

Within the hub are arranged rings $b$ $b'$, in the outer faces of which are formed annular grooves $b^2$, which are adapted to receive the rib $c$ of the spokes at the points where said spokes are in contact with said rings. As the spokes are normally pressed against the rings in the make-up and adjustment of the wheel the contact between the rib $c$ and the grooves $b^2$ prevents any lateral displacement of the spokes, while at the same time permitting free movement within the groove. These rings are preferably formed from sheet-steel, though other metal may be used which possesses the necessary resiliency and strength. It will be noted that two separate rings are used, that all the spokes on one side of the wheel bear against the ring on that side, and that there is a space between the two rings. This arrangement facilitates the truing of the wheel, as it permits the rings to be drawn toward each other as the spokes and plates are drawn together by the bolts in the manner set forth. One ring may be used having a plane face of less width than the space between the flanges of the plates, if desired.

When the parts above described are assembled, the axle-box E is inserted through the openings in the hub portion of the plates $a$ $a'$, with its rim $e$ fitting an annular recess in the plate $a$, and the opposite end of the box is then rimmed over the outer edge of the hub portion of the plate $a'$, as at $e'$.

It will be observed that as the plates $a$ $a'$ are drawn toward each other by the bolts 2 the spokes, which are secured within the respective plates and which are therefore on opposite sides of the central peripheral line of the hub, are also drawn toward each other, the effect of which is to tighten or wedge the spokes between the felly and hub bearings, thus expanding the flexible or resilient felly and contracting the steel rings within the hub against which the bent portions of the spokes bear, as described. The tense conditions thus produced result in giving the wheel the highest degree of resiliency, there being no dead parts in its make-up, the felly and the rings within the hub serving as cushions between which are tightened or made taut the spokes, which in the bent form shown possess more or less inherent resiliency or flexibility. This is the most important feature of my invention, and as the tightening of the several parts described may be effected in various ways I do not wish to be limited to the method described, nor do I limit myself to the peculiar form of felly or of bent spoke, provided such felly and spoke possess resiliency.

Having thus described my invention, what I claim as new, and desire to secure by Letters Patent, is—

1. In a wheel, a hub formed of plates adapted to be adjusted relatively to each other, and having formed therein radial grooves and grooves connecting said radial grooves, and spokes fitting said radial and connecting grooves, as set forth.

2. In a wheel, a hub formed of plates adapted to be adjusted relatively to each other and having formed in their inner faces radial grooves and grooves connecting said radial grooves, and spokes each of which is formed of a single rod bent to fit said radial and connecting grooves substantially in the manner and for the purpose set forth.

3. In a wheel, a hub having formed therein U-shaped ways or channels adapted to receive a plurality of spokes having longitudinal ribs thereon, each of said spokes being formed of a single rod bent upon itself in substantially U-shape form, as set forth.

4. In a wheel, rings or collars arranged within the hub and having annular grooves in their faces, and spokes having ribs adapted to fit said grooves substantially in the manner described.

5. In a wheel, rings or collars arranged within the hub and having annular grooves in their faces, and spokes bent in substantially U shape and having ribs adapted to fit said grooves, as set forth.

6. In a wheel, rings or collars loosely arranged within the hub, and U-shaped spokes arranged to bear on the peripheries of said rings, whereby the rings are supported in the hub and a yielding bearing furnished for the spokes.

7. In a wheel, rings or collars loosely arranged in the hub and having peripheral grooves formed in the outer face, and spokes having bent portions adapted to bear on the peripheries of said rings, and said bent portions having a projecting rib adapted to fit said peripheral grooves, substantially in the manner and for the purpose set forth.

8. In a wheel, a hub composed of two plates having ways or channels provided therein to receive the spokes, rings or collars arranged loosely within the hub, and spokes having bent portions fitting said ways or channels and bearing against the peripheries of said rings or collars, substantially as set forth.

9. In a wheel, a hub composed of two plates having ways or channels provided therein to receive the spokes, rings or collars arranged loosely within the hub and having their outer face grooved, and spokes having bent portions fitting said ways or channels and bearing against the peripheries of said rings or collars, said spokes being formed with ribs adapted to fit the grooves in said rings, substantially as set forth.

10. In a wheel, a hub formed by plates adjustable relatively to each other and having ways or channels to receive the spokes, and means loosely arranged within the hub having lateral bearings for the spokes and forming resilient end bearings for the spokes, substantially as described.

11. In a wheel, spokes, each formed from a single bar bent in substantially U shape, and means whereby a resilient support is furnished said spokes within the hub, said means being loosely arranged within the hub and held in position by the pressure of the several spokes bearing thereon, substantially in the manner and for the purpose set forth.

12. In a wheel, a resilient felly, resilient rings loosely arranged within the hub, and spokes having adjustable bearings on said felly, and with end and lateral bearings on said rings, as set forth.

13. In a wheel, a resilient felly, resilient rings loosely arranged within the hub, spokes having bearings on said felly and rings, said spokes arranged on opposite sides of the peripheral center of the hub, as set forth.

14. In a wheel, a resilient felly, resilient rings loosely arranged within the hub, spokes having adjustable bearings on said felly and having bent portions bearing on said rings, said spokes arranged on opposite sides of the peripheral center of the hub, as set forth.

15. In a wheel, a resilient felly, resilient rings loosely arranged within the hub, spokes bearing on said rings and felly and arranged on opposite sides of the peripheral center of the hub, and means forming the hub, whereby the spokes may be wedged and tightened between their bearing-points, substantially as set forth.

16. In a wheel, a resilient felly, a hub formed of plates adjustable relatively to each other and having ways therein to receive the spokes, means for adjusting said plates, resilient rings loosely arranged within the hub, spokes bearing on said felly and rings and passing through the ways in said plates on opposite sides of the peripheral center of the hub, as set forth.

17. In a wheel, a resilient felly, a hub formed of plates adjustable relatively to each other and having ways therein to receive the spokes, rings arranged within the hub, and spokes having adjustable bearings in said felly, passing through said plates and having bent portions bearing on said rings, as set forth.

18. In a wheel, the combination of a resilient ring loosely arranged within the hub, and U-shaped spokes arranged in intersecting lines around the periphery of said ring, the latter furnishing a resilient bearing for said spokes, all substantially in the manner and for the purpose set forth.

19. In a wheel, the combination of a resilient ring loosely arranged within the hub, and U-shaped spokes arranged in intersecting lines around the periphery of said ring and on opposite sides of the peripheral center of said hub, said ring furnishing a resilient bearing for said spokes, substantially as described.

20. In a wheel, the combination of U-shaped felly, U-shaped spokes having their ends adjustably secured in said felly, hub-plates having ways provided therein for the spokes, and being adjustable relatively to each other, means for adjusting said plates, rings loosely arranged within the hub and adapted to furnish resilient bearings for the bent portions of the spokes, and said spokes arranged in intersecting lines around the peripheral center of said rings and on opposite sides of the hub formed by the hub-plates, and means for inclosing the space between the two lines of spokes, substantially as set forth.

21. As a new article of manufacture a metal wheel having a flexible felly, spokes having bent portions within the hub and arranged on opposite sides of the peripheral center of the hub, flexible bearing-rings for the bent portions of the spokes, means for increasing the tension of the spokes, and means for drawing the oppositely-arranged spokes toward each other whereby the tension of the wheel is effected in its entirety, thereby producing a resilient wheel.

22. As a new article of manufacture, a metal wheel having a flexible felly, bent spokes, a flexible bearing within the hub for the spokes, and means for tightening said spokes between the hub-bearing and the felly, as described.

WILLIAM HENRY SCHOFIELD.

Witnesses:
O. K. TREGO,
FREDERICK BENJAMIN.